United States Patent [19]

James

[11] Patent Number: 4,969,819
[45] Date of Patent: Nov. 13, 1990

[54] ECM SIMULATOR FOR MISSILE FIRE CONTROL SYSTEM VULNERABILITY STUDIES

[75] Inventor: Wilbur G. James, Falls Church, Va.

[73] Assignee: The United States of America as represented by the Secretary of the Navy, Washington, D.C.

[21] Appl. No.: 880,455

[22] Filed: Dec. 3, 1969

[51] Int. Cl.[5] .......................... G09B 9/54; G01S 7/38
[52] U.S. Cl. ......................................... 434/5; 342/13; 342/165
[58] Field of Search ...................... 35/10.4; 343/18 E; 342/13, 165; 434/2, 5

[56] References Cited

U.S. PATENT DOCUMENTS

| | | | |
|---|---|---|---|
| 3,291,885 | 12/1966 | Eisele | 35/10.4 |
| 4,192,082 | 3/1980 | Deaton et al. | 342/13 X |
| 4,467,327 | 8/1984 | Drake et al. | 434/2 X |
| 4,730,191 | 3/1988 | Groebke | 434/2 X |

Primary Examiner—T. H. Tubbesing
Attorney, Agent, or Firm—Kenneth E. Walden

[57] ABSTRACT

An electronic countermeasure (ECM) simulator that is particularly adaptable for use in missile fire control system vulnerability studies. A general purpose digital computer is utilized to control the simulation of true target radar skin return signals and ECM signals. These ECM signals would be representative of those produced by attacking and stand-off aircraft carrying deception and obscuration jamming.

34 Claims, 7 Drawing Sheets

FIG. 8

ECM SIMULATOR FOR MISSILE FIRE CONTROL SYSTEM VULNERABILITY STUDIES

BACKGROUND OF THE INVENTION

This invention relates generally to an Electronic Countermeasure (ECM) Simulator and more particularly to an ECM simulator that will simultaneously generate signals for one search and one tracking radar.

In the past, ECM simulators were designed for either search or tracking radars and were generally unifunctional. Thus, there were simulators designed for noise jamming, for deception by repetition of false targets or for deception by velocity or range pull-off. Similarly, there have been ECM simulators that attempted to deceive tracking or search radars by angle deception or by countdown deception. The instant invention provides a multifunctional device that incorporates each of the above methods of ECM simulation and at the same time will simultaneously generate these signals for both C-band and S-band radars.

BRIEF SUMMARY OF THE INVENTION

The basic objective of the simulator of the present invention is to provide a capability for realistically evaluating vulnerability of complete missile fire control systems. Of particular significance is that to perform such an evaluation, one must simultaneously present, to both search and track radars, "skin-return" and ECM signals representative of those produced by attacking and stand-off aircraft carrying ECM equipment.

In consideration of the preceding, the present simulator provides multiple simultaneous signals for both search and track radars. By means of a few general purpose modules, simulated skin return and ECM signals representative of two ECM carrying attack vehicles in dynamic tactical situations are generated in real time and at true microwave frequencies. These signals are radiated into the host radar antennas. A general-purpose digital computer is programmed to simulate various elements of the tactical situation while simultaneously controlling physical RF signal simulators in accordance with the internal simulations. Typical situation elements which are analytically simulated are vehicle trajectories and aerodynamics, ECM antennas, and electromagnetic propagation phenomena. The computer employed also controls a builtin data acquisition system via which it acquires realtime data on various radar and ECM system parameters as required for control of simulator operation and for posttest analysis.

The simulator permits generation of signals representative of virtually all anticipated ECM techniques. These techniques can be exercised against radars using frequency diversity, pulse compression, coherent and noncoherent coherent MTI, and pulsed doppler as well the more conventional radars. The design also permits simulation of real ECM equipment with realistic signals while simultaneously generating true target skin return signals; thus the effectiveness of real ECM equipment can be determined.

It is therefore an object of this invention to provide an ECM simulator that can be utilized in determining the vulnerability of missile fire control systems.

It is another object of this invention to provide an ECM simulator that will simultaneously generate signals for both search and track radars.

Another object of this invention is to provide an ECM simulator that will generate both skin-return and ECM signals.

Another object of this invention is to provide an ECM simulator that will simulate deception by repetition of incoming radar pulses.

A further object of this invention is to provide an ECM simulator that utilizes a digital computer as a control element.

A still further object of this invention is to provide an ECM simulator that will provide velocity and range deception simulation as well as angle deception.

The foregoing and other objects of this invention will be more fully understood from the following description when considered with the accompanying drawings, in which:

DETAILED DESCRIPTION OF THE INVENTION

Figure 1:
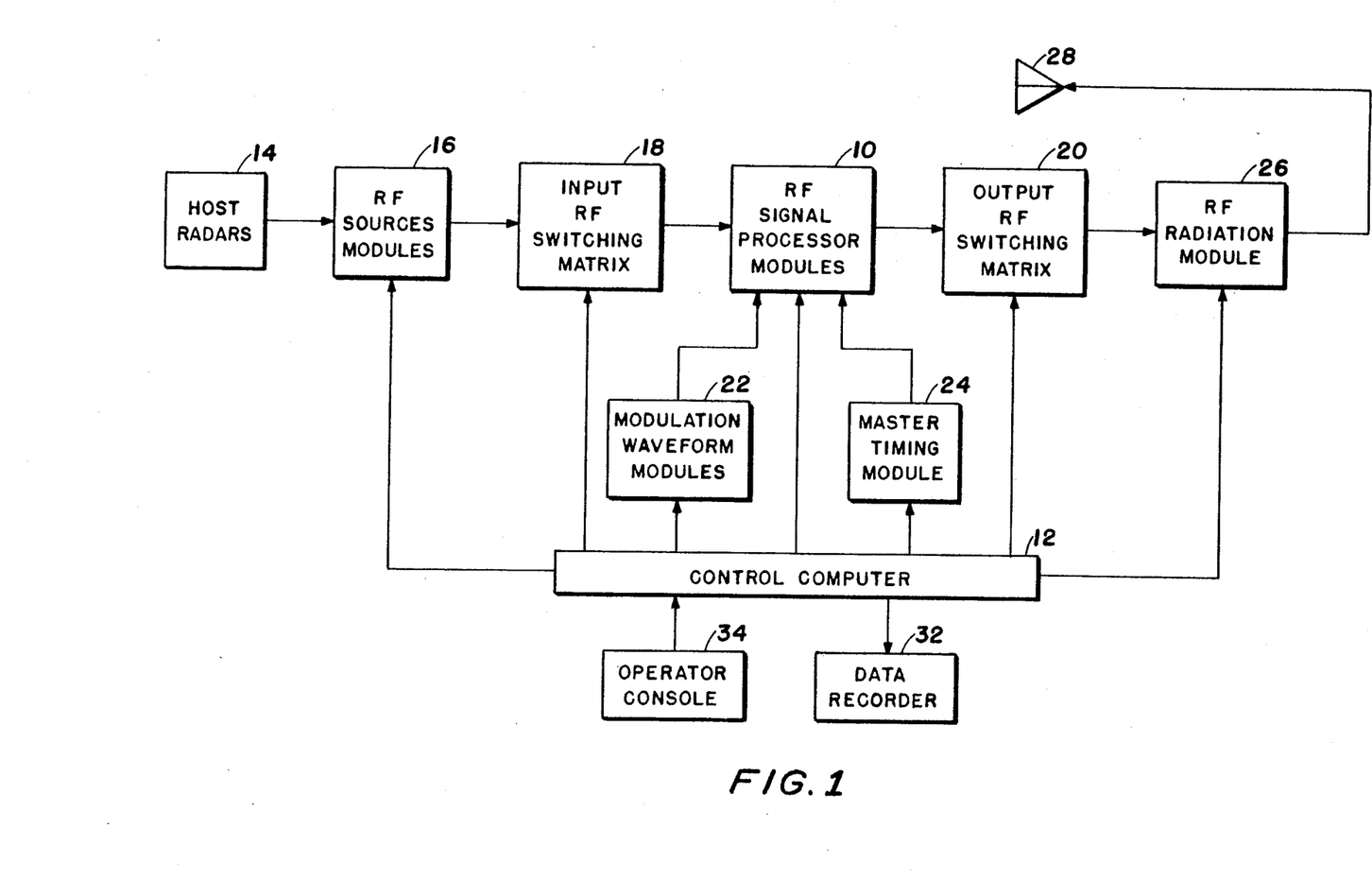
FIG. 1 is a block diagram depicting the overall ECM simulator.

The overall simulator is indicated in FIG. 1. As indicated earlier, it consists of a set of functional modules 10 for signal generation and a general-purpose digital computer 12 for module control, module interconnection, target parametric information and data collection and recording. Two attacking vehicles, each carrying deception and noise jammers, can be simulated simultaneously by the functional modules 10 in both C-band and S-band. The host radars, depicted within block 14, are C-band tracking radars and an S-band 3-D search radar.

The RF source modules 16 provide continuouswave (CW) signals whose frequencies are equal to those received by the host radars under test. The input RF switching matrix 18 routes these CW signals to one or more of the RF signal processor modules 10; the switching may be under either manual or computer control. The RF signal processors 10 convert the CW signals such that the signals fed to an output RF switching matrix 20 are essentially identical to those signals which the radars would receive from the targets ("skin-return") and ECM equipment in the real-world situation being simulated. Both "skin-return" and ECM signals will be correct in carrier frequency, doppler frequency, amplitude, phase, time of occurrence, and duration. These parameters are directly controlled by modulation waveform modules 22 and a master timing module 24, all of which are under computer control, as will be described in more detail hereinafter.

Most of the functional elements of this invention are under computer control or direction. This interconnection is therefore denoted on all of the drawings, except FIGS. 1, 3a and 3b, by an encircled X.

The output RF switching matrix 20 routes the signals to an appropriate waveguide in an RF radiation module 26. Waveguides in this module 26 then route the signals to a simulating antenna 28 for propagation.

A rather unusual feature of the simulator design is that although general-purpose digital computer 12 is used for control and analytical simulation, the user has virtually the same direct control of system parameters that he conventionally has in analog simulations. This control is provided by a keyboard (not shown) on an operator console 34. In the program for the computer 12, each parameter which the user might wish to change is identified by a number. Normally, the computer program will assign an initial value to each of these parameters. However, if after a test has been started the user wishes to modify a particular parameter, the keyboard is manipulated in a predesignated manner, thus signaling the computer to replace the numerical value of the parameter in question.

To facilitate an understanding of the techniques of computer controlled signal generation, the operation of each of the functional modules will be described. These modules are utilized to generate: true target skin return signals, deception by repetition signals, and noise jamming signals.

Figure 2:
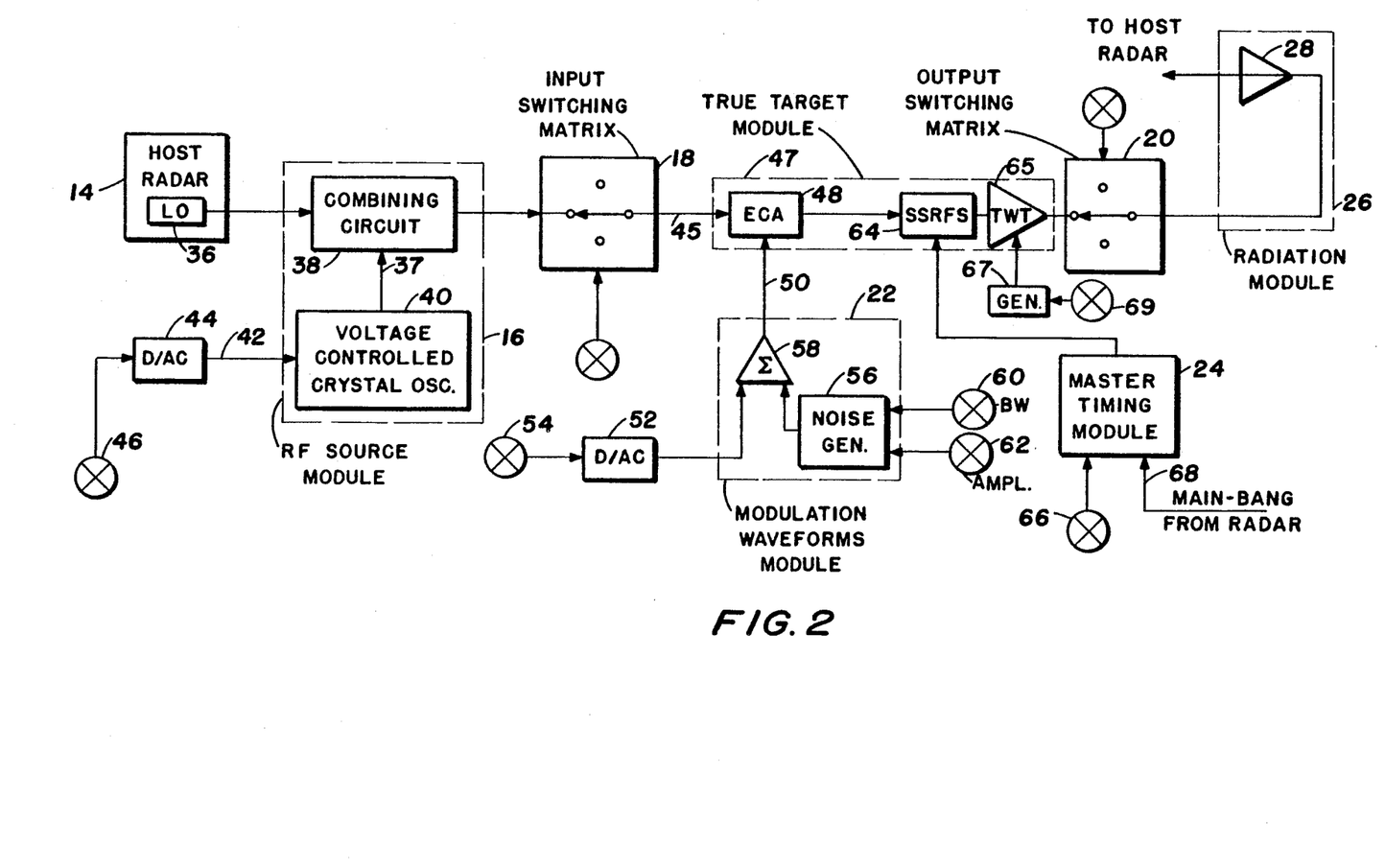
FIG. 2 is a block diagram illustrating that portion of the simulator that generates true target skin return signals.

FIG. 2 shows the functional module used for generating a true target skin return. A basic operating RF signal is obtained by tapping into a local oscillator 36 from one of the host radars 14 and heterodyning the local oscillator frequency with a control signal 37 in a combining circuit 38 to produce a signal of the same frequency as would normally be received by the radar 14. Control voltage 37 is produced by a voltage controlled crystal oscillator (VCCO) 40. The operation of VCCO 40 is controlled by a voltage 42 which is generated by a digital-to-analog converter 44 (D/AC) under control of the computer 12, as shown at 46. As the control voltage 42 is set to be proportional to the target velocity, the frequency of the signal exiting from the combining circuit 38 can be made to be equal to that which the true target signal would have upon its return to a radar. Such information as target velocity versus time and VCCO transfer characteristics which the computer requires to generate the correct VCCO control voltage is made available to the computer via its control program.

The converter 44 which generates the VCCO control voltage 42 is designed so that it will hold its output constant until the computer feeds it a new doppler control word. This will be done when the target radial velocity changes by an amount equal to the velocity resolution desired for the simulation.

The input switching matrix 18 which consists of electrically driven RF switches (not shown) routes the output 45 of RF source module 16 to a true target module 47. Within module 47, the output 45 is first fed to an electrically controlled RF attenuator 48 (ECA) which may be of the pin diode variety. These devices produce attenuation (in decibels) in response to a control signal 50. The control signal 50 is an analog signal whose magnitude is such that when fed to the ECA, the amplitude of the RF signal exiting from the ECA will have the correct amplitude, as would be produced by a true target in the real-world situation being simulated.

This amplitude control signal 50 is generated by a digital-to-analog converter 52 under control of the computer 12, as shown at 54. To establish the appropriate amplitude, the computer uses the standard two-way radar equation. Such target parametric data as target cross-section, target range, and antenna gain, as are required for this calculation, will have been fed to the computer either via its control program or from the operator console 34.

Figure 3A:
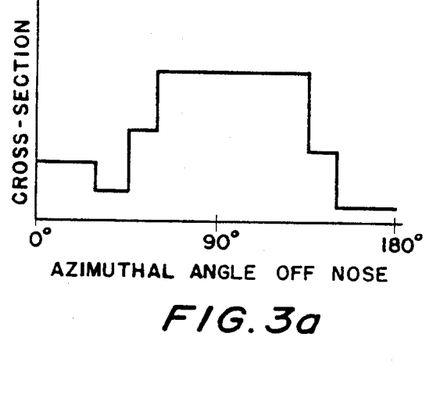
FIGS. 3a and 3b are plots of target cross section versus angle.
Figure 3B:
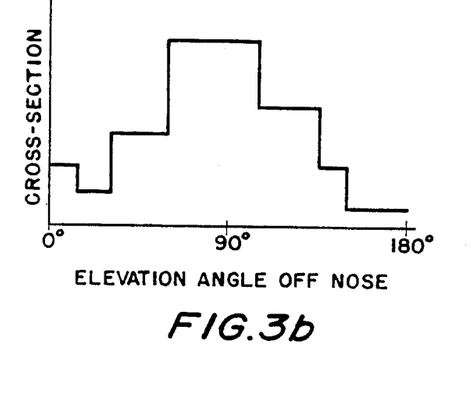

Three-dimensional target cross-section data will be fed to the computer memory as two tabulations of cross-section versus angle, one tabulation for a horizontal plane through the longitudinal target axis, the other for a vertical plane through the axis. FIGS. 3a and 3b show plots typical of those from which these tabulations would be made. The computer will be programmed to use these data in an elliptical interpolation program to determine target cross-section for various radar-to-target aspect angles.

Antenna gain patterns will be simulated or represented in essentially the same way, i.e., gain in two perpendicular planes will be tabulated and stored and an elliptical interpolation will then be used to determine gain for various angles off boresight.

Referring again to FIG. 2, the simulation of target return signal scintillation, is performed by the computer 12 which utilizes a noise generator 56 in the modulation waveform module 22, sets its bandwidth and amplitude appropriately, and connects its output to a summing amplifier 58 to which the output of the converter 52 is also being applied. The computer updates both the converter at 54 and noise generator control signals at 60 and 62 as necessary to maintain the RF signal level equal, within acceptable error limits, to that signal level which the real target would produce in an actual situation.

The output from the attenuator 48 is fed to a fast solid state RF switch (SSRFS) 64. Normally this switch is biased for maximum attenuation which means that there will be virtually no transmission therethrough. Following each radar "main-bang," the switch is opened at the proper instant and for the proper time duration to send to the radar a signal which will arrive at the same instant as would a real signal from a real target under actual conditions. The timing of this signal is controlled by the master timing module 24 (MTM) which may be a digital delay generator and is controlled by the computer 12, as shown at 66. The module 24 is fed "main-bang" pulses from the radar at 68; following each "mainbang" pulse, the module 24 generates a pulse which is delayed with respect to the "main-bang" by an amount equal to the transit time from the radar to the target and return. These pulses "open" the switch 64; their width is equal to the radar pulse width. The computer uses target location and propagation velocity to calculate the required transit-time delay. It then sets the module 24 to effect this delay, updating it periodically as required to maintain desired accuracy.

The output of switch 64 is routed to a traveling wave tube 65 which, in turn, is modulated by a sawtooth generator 67 under computer control at 69. The traveling wave tube 65 is a broad-band microwave tube that is used as a modulating oscillator. The modulating frequency for the traveling wave tube is provided by the sawtooth generator 67. Thus, the traveling wave tube serrodynes the output of the solid state RF switch 64 with the sawtooth output of the generator 67. The RF output signal from the traveling wave tube 65 is routed via the output switching matrix 20 to the appropriate waveguide in the radiation module 26 which routes it to an antenna 28 from which it is radiated.

Figure 4:
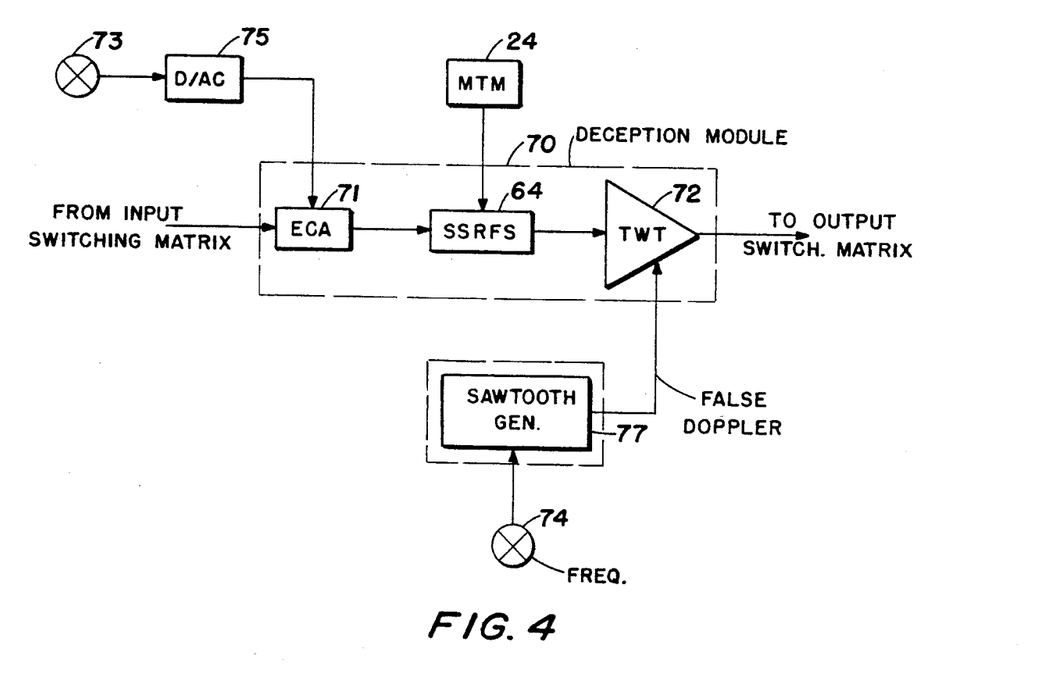
FIG. 4 is a block diagram illustrating that portion of the simulator that generates repetition deception signals.

Referring now to FIG. 4, signals simulating deception by repetition are generated by Deception Target Module 70 which is identical to the True Target Module 47 just described. The principal difference between the two modules is the type of modulation impressed upon attenuator 71, switch 64, and TWT 72. This modulation differs from that impressed upon the true target module in that false velocity and range values as well as other deception techniques. The amount of attenuation impressed upon ECA 71 is controlled by the computer 12, as shown at 73 through a digital to analog converter 75. The amount of attenuation determines the repeater gain.

The traveling wave tube 72 is serrodyned by sawtooth generator 77 to simulate false velocity rates. Frequency ranges are selected by the computer at 74.

Figure 5:
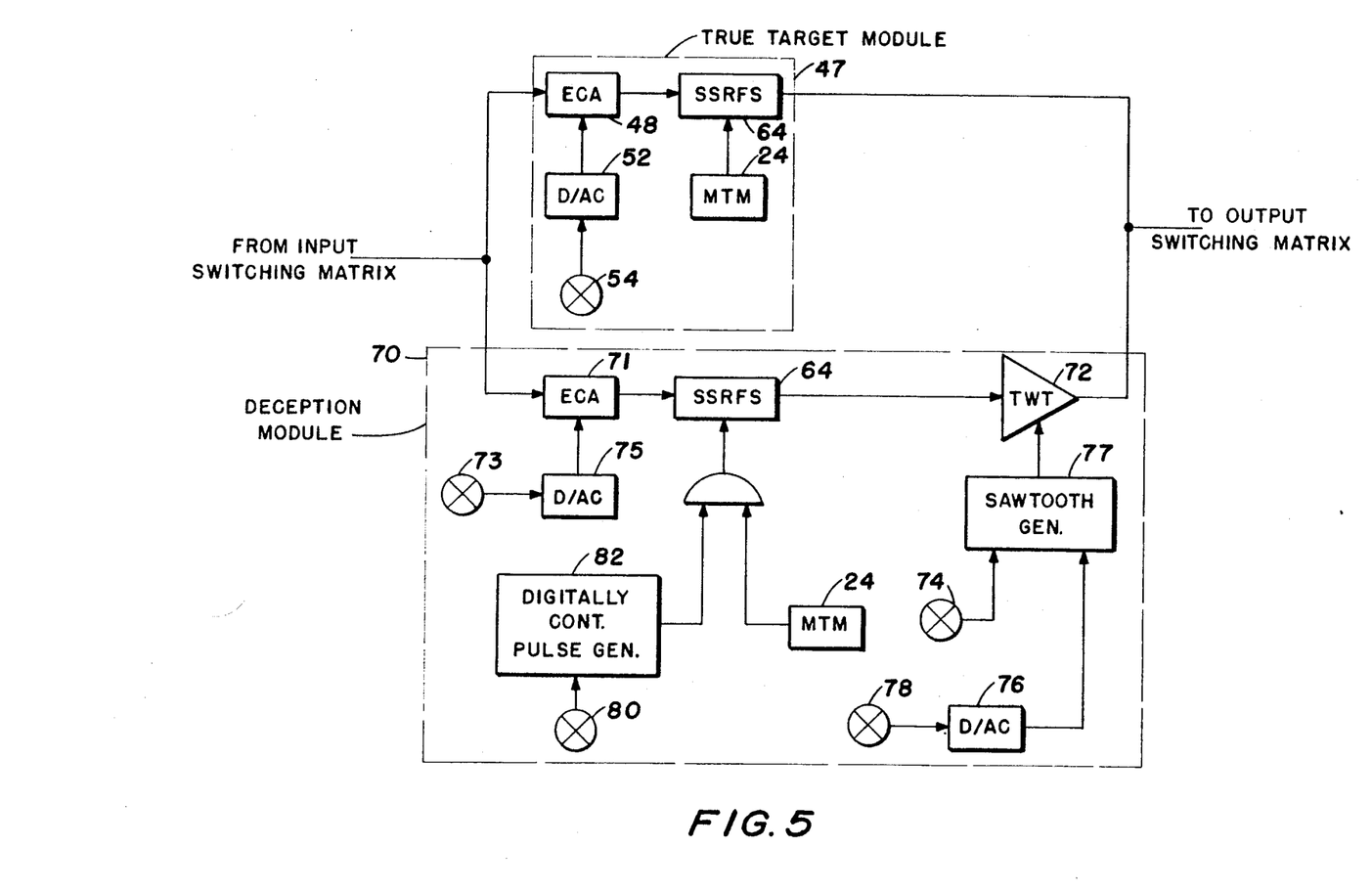
FIG. 5 is a block diagram depicting a typical configuration for repeater simulation.

To facilitate a better understanding of how a true target carrying a deception repeater is simulated, the simulator set-up and computer program for such a simulation will now be described, with reference being made to FIG. 5. The true target module 47 will simulate the true target skin return and the deception module 70 the repeater return. For the deception procedures described below, the computer controls the true target module as though no deception were being practiced since under actual conditions skin return signals occur regardless of whether or not jamming is taking place. For a false range value operation, the computer 12 will initially drive the electrically controlled attenuator 71 to maximum attenuation. Then, at the start of the deception program, the computer 12, as shown at 73, will, through the converter 75, start gradually reducing the attenuation of the attenuator 71. Simultaneously, via the module 24, the repeater channel output will be delayed with respect to the true target module output by a fraction of a microsecond to simulate repeater "turnaround" time. After the computer has reduced the deception module attenuation to the point that this channel output is much greater than that of the true target module, it will start to increase further the delay in the deception module, i.e., the deception signal will take the appearance of a range "walk-off". After this signal has been "walked-off" in range to the programmed extent, the computer might either terminate repeating by abruptly discontinuing the output from the module 24 to the deception module, repeat the range "walk-off" program, or initiate some other deception operation.

To simulate a velocity "walk-off" coincident with the range "walk-off", the computer 12, as shown at 74, would start a serrodyne sawtooth generator 77 at the time the range gate walk-off started. As the walk-off proceeded, the computer at 78 through D/AC 76 would control the sawtooth frequency to make it correspond to that doppler which a vehicle would generate were its range changing at the rate implied by the range walk-off rate.

To simulate the deception technique known as countdown, the computer at 80 would control the repetition rate and duty cycle of a digitally controlled pulse generator 82. Since in the countdown technique, the rate of change of these parameters is relatively low, their control places no strain on the computer.

To simulate angle deception against a conical-scan-on-receive-only (COSRO) radar, the computer uses the same pulse generator 82 used for countdown. It sets in the desired duty cycle, then sweeps the frequency across the suspected COSRO scan frequencies.

Figure 6:
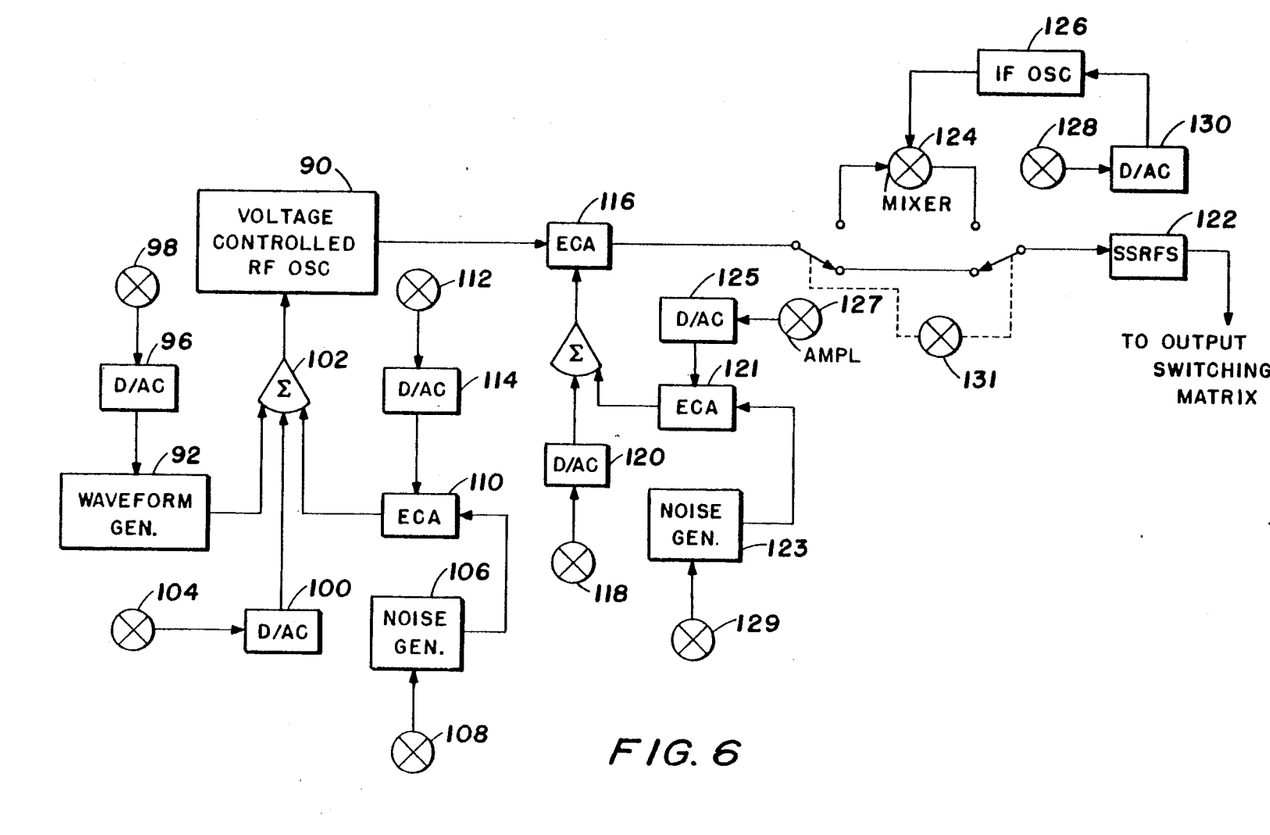
FIG. 6 is a block diagram of that portion of the simulator that generates noise jamming signals.

FIG. 6 indicates the design of the noise jammer module employed. A voltage controlled RF oscillator 90 is the basic source of noise jamming signals. An associated waveform generator 92 produces sine, square, triangle, sawtooth, and ramp signals for sweeping the frequency of the oscillator 90. The output frequency of the waveform generator 92 is controlled by a voltage from a digital-to-analog converter 96 which is controlled by the computer 12, as shown at 98. The center frequency of the oscillator 90 is controlled by a second digital-to-analog converter 100 which feeds a summing video amplifier 102. The converter 100 is regulated by the computer 12, as shown at 104. A noise generator 106 is also provided for FM modulation of the oscillator 90. The bandwidth of the generator 106 is controlled by the computer 12, as shown at 108. The noise generator output feeds an electrically controlled attenuator 110 which is controlled by the computer 12, as shown at 112, via a digital-to-analog converter 114. The output from the attenuator 110 is summed with other FM control voltages in the summing amplifier 102.

The output from the oscillator 90 is amplitude modulated by an electrically controlled RF attenuator 116. The same attenuator is used to control the average level of noise jammer output to account for such factors as jammer transmitter antenna gain and one-way propagation losses. This control is effected via the computer 12, as shown at 118, through yet another digital-to-analog converter 120. Signal scintillation is produced by an attenuator 121 and a noise generator 123 in essentially the same manner as previously described. More specifically, the attenuator 121 receives a control signal from a digital-to-analog converter 125 which, in turn, receives its input control signal from the computer 12, as shown at 127. The noise generator 123 receives its input control signal from the computer 12, as shown at 129.

The output from the attenuator 121 can be routed directly to a solid state RF switch 122 which is used for false target generation or to a double-sideband-suppressed-carrier mixer 124. Switch 122 is activated by a control signal from the computer 12, as shown at 131. Via this mixer and a voltage controlled IF oscillator 126, IF jamming techniques can be simulated. The oscillator 126 is controlled by the computer 12, as shown at 128, through a digital-to-analog converter 130.

Figure 7:
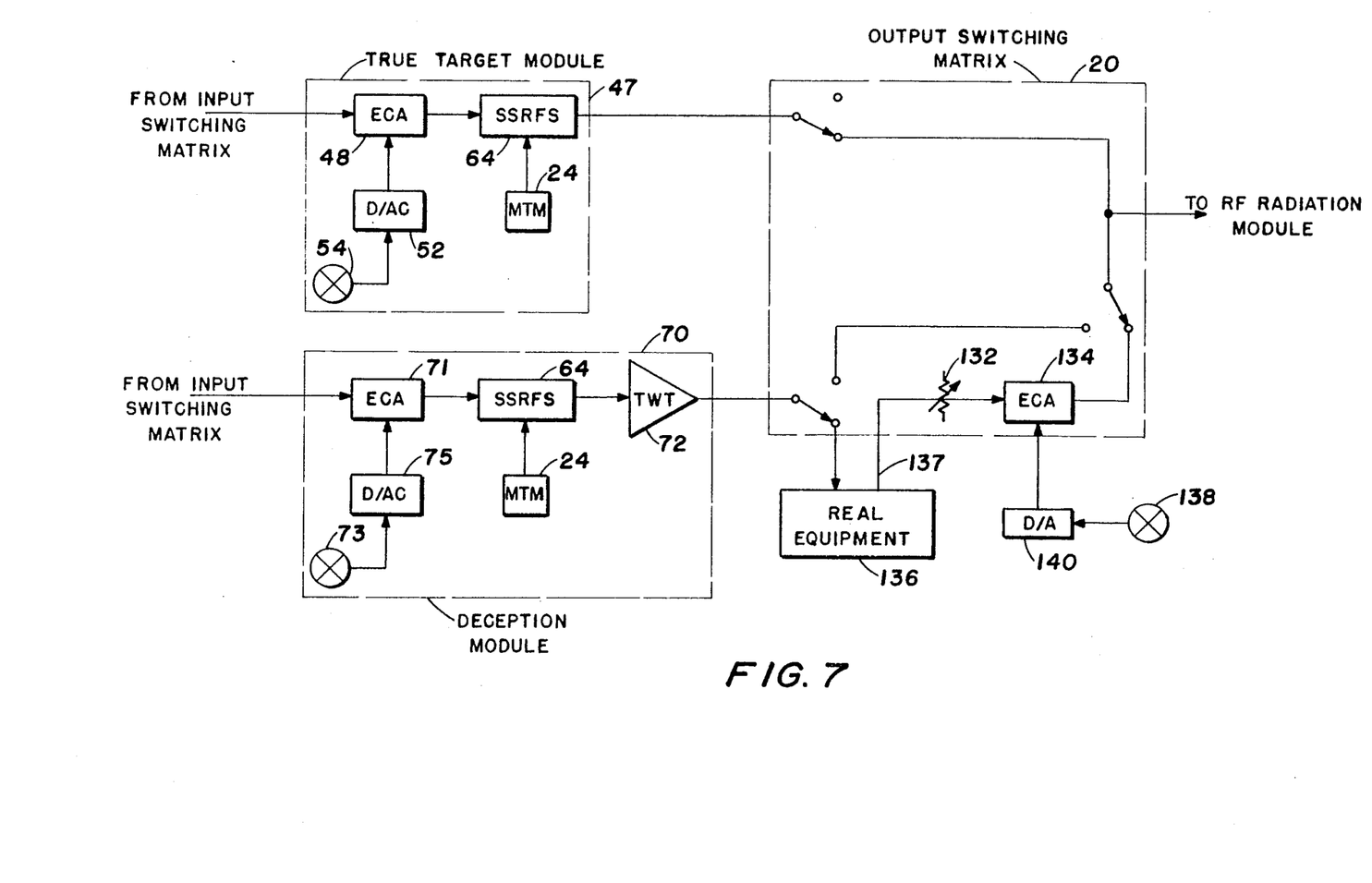
FIG. 7 is a block diagram illustrating the simulator configuration utilized in testing real equipment.

Referring now to FIG. 7, the output switching matrix 20 also contains a manual RF attenuator 132 and an electrically controlled attenuator 134. These are used when a piece of real ECM equipment is to be tested. For tests of ECM equipment which intercept victim radar signals, such as deception repeaters do, a deception module 70 is used to generate signals simulating those which the real equipment would receive from its antenna. These signals are fed directly to real equipment 136 in real time. The output 137 of the equipment 136 is attenuated by the manual attenuator 132 to a level equal to the maximum level which the situation to be simulated will require in the test. The output of the attenuator 132 is then fed to an attenuator 134 which, under computer control as shown at 138, via a digital/analog converter 140, varies the level as required in order to account for jammer transmitting antenna gain and for one-way propagation losses. The output from attenuator 134 is then fed to a waveguide (not shown) which routes it to a simulator antenna (not shown). Simultaneously, true target module 47 generates a skin-return signal which simulates the signal from the vehicle assumed to be carrying the real equipment. This signal is summed with the signal from the real equipment and is radiated simultaneously from a simulator antenna.

Figure 8:
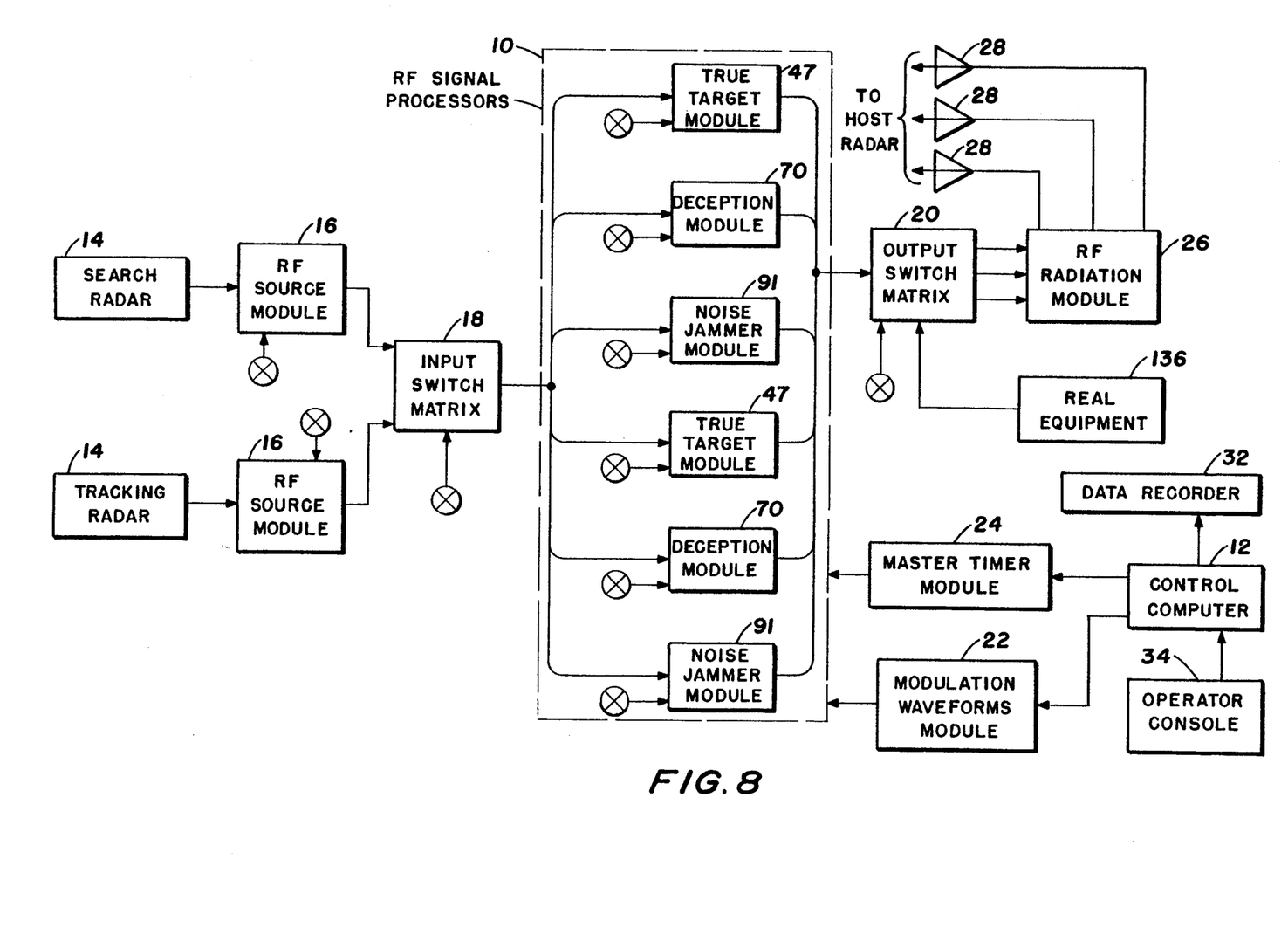
FIG. 8 is a block diagram which portrays the complete ECM simulator system.

The complete simulator design is indicated in FIG. 8. Two ECM practicing targets can simultaneously be simulated in both C-band and S-band, i.e., in both the tracking radar and search radar bands. More specifically, all the following signals can be simulated simultaneously:

- 2 - C-band skin return signals
- 2 - C-band deception signals
- 2 - C-band noise/false target jammer signals
- 2 - S-band skin-return signals
- 2 - S-band noise/false target jammer signals.

Alternatively, the C-band deception channels and the S-band noise/false target channel can be used to simulate true targets, giving a capability for simulating four targets in a clear environment.

In summary, therefore, an ECM simulator having great versatility and exceptional capability has been designed for use in missile fire control system vulnerability studies. The simulator will simultaneously generate signals for one search and one track radar. The signals will realistically simulate skin return signals and deception and noise jammer signals from two attacking vehicles. To speed test and minimize degradation or results by human errors, the simulator design uses extensive automation in calibration, setup, checkout, and data acquisition. It is expected to improve significantly the ability to uncover and quickly correct ECM vulnerabilities of missile fire control systems.

What is claimed is:

1. An ECM simulator capable of generating a simulated true target signal and ECM signals such as would be received by a host radar, comprising:
    means for generating a continuous wave signal whose frequency is equal to the frequency of a signal normally received by such host radar;
    control means;
    a plurality of converting means for converting said continuous wave signal into such true target signal and such ECM signals, the parameters and operation of said converting means being regulated by said control means;
    a first switching means for routing said continuous wave signal into the appropriate converting means, said routing being controlled by said control means;
    a plurality of radiating means; and
    a second switching means for routing the outputs of said converting means to the appropriate radiating means, said routing being controlled by said control means.

2. The invention as claimed in claim 1 wherein said plurality of converting means comprises:
    means for converting said continuous wave signal into a true target skin return signal;
    means for converting said continuous wave signal into a deception-by-repetition signal; and
    means for converting said continuous wave signal into a noise jamming signal.

3. The ECM simulator as recited in claim 2 wherein said means for converting said continuous wave signal into said true target skin return signal comprises:
    means for producing an amplitude control signal, the magnitude of said control signal being regulated by said control means in such a manner that the amplitude of said amplitude control signal will be proportional to the amplitude of a signal produced by a true target,
    means for attenuating said continuous wave signal, said attenuation being dependent upon the amplitude of said amplitude control signal, said attenuating means thereby producing a signal whose amplitude is the same as the amplitude of a signal produced by a true target, and
    means for regulating the transmission of said attenuated control signal in time whereby only that portion of said attenuated control signal will be transmitted to reflect the proper transit time delay following a radar main-bang from a true target signal intercept.

4. The ECM simulator as claimed in claim 3 wherein said means for producing said amplitude control signal comprises:
    first generating means for producing target return signal scintillation,
    second generating means for producing a signal whose amplitude will reflect target parametric information, and
    summing means for combining the signals produced by said first and second generating means, for producing said amplitude control signal.

5. The ECM simulator as claimed in claim 4 wherein said second generating means is a digital-to-analog converter under the control of said control means, said control means providing target parametric information.

6. The ECM simulator as claimed in claim 4 wherein said first generating means is a noise generator whose bandwidth and amplitude is regulated by said control means.

7. The ECM simulator as claimed in claim 4 wherein said attenuating means is a pin diode RF attenuator.

8. The ECM simulator as claimed in claim 4 wherein said means for regulating the transmission of said attenuated control signal in time comprises:
    switching means for allowing said attenuated control signal to pass or to be blocked, and
    means for regulating the timing of said switching means.

9. The ECM simulator as claimed in claim 8 wherein said means for regulating the timing of said switching means is a digital delay generator, said generator being regulated by said control means.

10. The ECM simulator as claimed in claim 2 wherein said means for converting said continuous wave signal into a deception-by-repetition signal comprises:
    means for producing an amplitude control signal, the magnitude of which is regulated by said control means in such a manner that the amplitude of said amplitude control signal is proportional to the amplitude of a signal produced by a true target,
    means for attenuating said continuous wave signal, said attenuation being dependent upon the amplitude of said amplitude control signal, said attenuating means thereby producing an output which is a signal whose amplitude is exactly the same as the amplitude of a signal produced by a true target,
    means regulating the transmission of said attenuated control signal in time such that only that portion of said attenuated control signal is transmitted as would reflect the proper transit-time delay following a radar main-bang,
    means for generating a plurality of frequency-varying signals, and means for combining said regulated, attenuated control signal with said frequency-varying signals, whereby the resultant combined signal is a deception signal which simulates a true target having a varying velocity.

11. The ECM simulator as claimed in claim 10 wherein said means to produce said amplitude control signal is a digital-to-analog converter, said converter being regulated by said control means.

12. The ECM simulator as claimed in claim 10 wherein said attenuating means is a pin diode RF attenuator.

13. The ECM simulator as claimed in claim 10 wherein said means for regulating the transmission of said attenuated control signal in time comprises:
   switching means for allowing said attenuated control signal to be passed or blocked, and
   means for regulating the timing of said switching means.

14. The ECM simulator as claimed in claim 10 wherein said means for regulating the timing of said switching means is a digital delay generator, said generator being regulated by said control means.

15. The ECM simulator as claimed in claim 10 wherein said frequency-varying generating means is a sawtooth generator whose frequency values are regulated by said control means.

16. The ECM simulator as claimed in claim 2 wherein said means for converting said continuous wave signal into said noise jamming signal comprises:
   means for generating FM signals, said FM generating means having a specified center frequency and a specified sweep,
   a source of FM control signals for controlling the operation of said FM generator,
   means for amplitude modulating the output of said FM generator for producing an AM/FM signal,
   means for generating an IF signal, and
   means for combining said IF signal and said AM/FM signal,
   whereby said combined signal will adequately function as a noise jamming signal.

17. The ECM simulator as claimed in claim 16 wherein said FM generator is a voltage controlled RF oscillator.

18. The ECM simulator as claimed in claim 16 wherein said source of FM control signals comprises:
   means for controlling the center frequency of said FM generator,
   means to control sweep of said FM generator, and
   means for frequency modulating said FM generator.

19. The ECM simulator as claimed in claim 18 wherein said center frequency controlling means is a digital-to-analog converter, said converter being regulated by said control means.

20. The ECM simulator as claimed in claim 18 wherein said means for controlling the sweep of said FM generator is a waveform generator, said waveform generator being regulated by said control means.

21. The ECM simulator as claimed in claim 20 wherein said waveform generator is a sine wave generator.

22. The ECM simulator as claimed in claim 20 wherein said waveform generator is a square wave generator.

23. The ECM simulator as claimed in claim 20 wherein said waveform generator is a triangle wave generator.

24. The ECM simulator as claimed in claim 20 wherein said waveform generator is a sawtooth generator.

25. The ECM simulator as claimed in claim 20 wherein said waveform generator is a ramp signal generator.

26. The ECM simulator as claimed in claim 18 wherein said means for frequency modulating said FM generator is an electrically controlled attenuator, said attenuator being regulated by said control means.

27. The ECM simulator as claimed in claim 16 wherein said amplitude modulating means is an electrically controlled attenuator, said attenuator being regulated by said control means.

28. The ECM simulator as claimed in claim 1 wherein said continuous wave generating means comprises:
   a first generating means for generating a signal of the same frequency as a host radar;
   a second generating means for generating a control frequency as selected by said control means, said control frequency serving to simulate a desired velocity; and
   combining means for combining the output of said first and second generating means wherein the output of said combining means is a signal whose frequency is identical to that frequency of an intercepted signal as received by such host radar.

29. The ECM simulator as claimed in claim 28 wherein said second generating means comprises:
   means for generating a control voltage as determined by said control means; and
   means responsive to said control voltage for producing said control frequency proportional to the amplitude of said control voltage.

30. The ECM simulator as claimed in claim 29 wherein said means for generating a control voltage responsive to said control means is a digital-to-analog converter.

31. The ECM simulator as claimed in claim 29 wherein said control frequency producing means is a voltage controlled oscillator.

32. The ECM simulator as claimed in claim 29 wherein said control frequency producing means is a voltage controlled crystal oscillator 33. The ECM simulator as claimed in claim 1 wherein said first switching means comprises a plurality of electrically driven RF switches, each switch being controlled by said control means.

34. The ECM simulator as claimed in claim 1 wherein said control means is a digital computer.

* * * * *